(12) United States Patent
Sting et al.

(10) Patent No.: US 7,690,644 B2
(45) Date of Patent: Apr. 6, 2010

(54) SUPPLY STATION FOR POSITIONING ENCLOSURES ON AN ENCLOSURE-COLLATING PATH

(75) Inventors: Martin Sting, Bad Vibel (DE); Christian Botschek, Rodermark (DE); Rainer Oberheim, Bensheim (DE)

(73) Assignee: Pitney Bowes Deutschland GmbH, Heppenheim (DE)

( * ) Notice: Subject to any disclaimer, the term of this patent is extended or adjusted under 35 U.S.C. 154(b) by 1204 days.

(21) Appl. No.: 10/962,805

(22) Filed: Oct. 8, 2004

(65) Prior Publication Data

US 2005/0189697 A1 Sep. 1, 2005

(51) Int. Cl.
*B65H 1/00* (2006.01)

(52) U.S. Cl. .......... 271/162; 271/99; 271/100; 271/103; 271/106; 271/117; 271/277; 271/306

(58) Field of Classification Search .......... 271/99, 271/100, 103, 106, 277, 306, 162, 117
See application file for complete search history.

(56) References Cited

U.S. PATENT DOCUMENTS

| | | | | |
|---|---|---|---|---|
| 1,030,891 A | * | 7/1912 | Kast | 270/52.26 |
| 1,763,598 A | * | 6/1930 | Christophel | 271/31 |
| 2,753,097 A | * | 7/1956 | Kindseth et al. | 53/506 |
| 4,331,260 A | * | 5/1982 | Euteneuer et al. | 221/19 |
| 4,358,100 A | * | 11/1982 | Muller | 271/11 |
| 4,733,781 A | * | 3/1988 | Gerlach | 211/85.8 |
| 5,014,973 A | * | 5/1991 | Markert | 271/100 |
| 6,015,145 A | * | 1/2000 | Hartel | 271/98 |
| 6,142,551 A | * | 11/2000 | Ciavaglia et al. | 296/56 |
| 6,758,469 B2 | * | 7/2004 | Muller | 271/100 |

FOREIGN PATENT DOCUMENTS

| | | |
|---|---|---|
| DE | 19607708 C1 | 9/1997 |
| EP | 1332891 | 8/2003 |

* cited by examiner

*Primary Examiner*—Patrick H Mackey
*Assistant Examiner*—Gerald W McClain
(74) *Attorney, Agent, or Firm*—Christopher H. Kirkman; Angelo N. Chaclas

(57) ABSTRACT

A supply station for positioning enclosures on an enclosure-collating path of a mail-processing installation allows a simple conversion from operation for processing a stack of comparatively flexible, thin enclosures to operation for processing a stack of comparatively thick, essentially inflexible enclosures. The conversion is achieved using a magazine housing inside a supply station housing mounted so that it can be secured in two different pivot positions, whereby in one pivot position the lowermost enclosure of a stack of enclosures is bent using a vacuum arrangement in which the front end of the enclosure in the withdrawal direction can be gripped by a gripper, while in a second pivot position of the magazine housing, the front end in the withdrawal direction of a lowermost, comparatively thick and essentially inflexible enclosure is pushed by means of a pusher arrangement directly into the open claws of the gripper.

7 Claims, 4 Drawing Sheets

SUPPLY STATION FOR POSITIONING ENCLOSURES ON AN ENCLOSURE-COLLATING PATH

BACKGROUND OF THE INVENTION

The invention pertains to a supply station for positioning enclosures on an enclosure-collating path of a mail-processing installation.

Known supply stations contain in a housing or in a frame part of the installation a magazine housing for inserting a stack of enclosures. The magazine housing has in its lower front region in the enclosure withdrawal direction a cutout through which the lower and, relative to the enclosure withdrawal direction, front part of a stack of enclosures is uncovered.

By means of a cyclically actuable vacuum sucker arrangement installed below the enclosure magazine, the particular lowermost enclosure is bent downward, provided that it is flexible enough, at its front part in the enclosure withdrawal direction, and then assumes a position in which it is gripped by a gripper of a supply arrangement, for example, the gripper claws of a gripping arm that can be swiveled back and forth, and is then pulled out in an arc-like movement of the gripper under the remaining stack of enclosures and can be placed upon an enclosure compartment of an enclosure collating path of a mail-processing installation.

However, if enclosures with relatively little flexibility are to be processed in the supply station, then such enclosures, e.g., booklets, thin books, catalogs, folders made of fine cardboard, etc., cannot be bent downward by a vacuum sucker arrangement at the lower end of the magazine housing.

To process such enclosures, known supply stations are therefore used in which the base of the magazine housing is inclined in accordance with the direction in which the mouth of the gripper that is ready to withdraw the enclosure opens, and the comparatively inflexible enclosure is pushed forward by means of pusher arrangements acting upon the back of the lowermost enclosure in the enclosure withdrawal direction so that the front edge, in the enclosure withdrawal direction, of the particular enclosure can be gripped by the gripper.

The changing-over of a mail-processing installation to equip it with supply stations of either the first or second types described above is time-consuming. The costs also increase for a mail-processing installation in which supply stations with substantially different design features have to be held ready.

SUMMARY OF THE INVENTION

The problem that is to be solved by the invention is to create a supply station for the positioning of enclosures on a enclosure-collating path of a mail-processing installation, in which comparatively flexible enclosures and, following a changeover with few manual operations, enclosures that possess little or even no flexibility can be processed.

According to the invention, this problem is solved by means of a supply station for positioning enclosures on an enclosure-collating path of a mail-processing installation, the supply station including a supply-station housing which contains a magazine housing into which a stack of enclosures can be inserted and which in its bottom, front region, as seen in the enclosure-withdrawal direction, has a cutout which is open in the downward and forward directions and from which enclosures can be removed from the magazine housing. The station also includes a cyclically actuable, in particular pivotable vacuum-sucker arrangement by means of which the front region of a flexible enclosure, as seen in the enclosure-withdrawal direction, is bent downwards into a certain ready-for-withdrawal position. The supply-station also includes a driven gripper for gripping and withdrawing the respectively lowermost enclosure of the stack of enclosures and for transporting this enclosure onto the enclosure-collating path. The supply-station also includes a pusher arrangement which, at the bottom end of the magazine housing, acts, by means of a pusher element, on the rear border, which is directed away from the enclosure-withdrawal direction, of a low-flexibility, lowermost enclosure of a stack of enclosures formed from such enclosures of relatively low flexibility and pushes the front border of the enclosure in the direction of the awaiting, open gripper of the supply arrangement and pushes it into this gripper. A guiding and mounting arrangement is provided between the supply-station housing and the magazine housing such that the magazine housing can be pivoted in relation to the gripper of the supply arrangement, with the latter in its position for gripping and withdrawing an enclosure from a first operating position into a second operating position above a geometrical axis which runs above the magazine-housing base, and can be secured in the respectively selected operating position. Accordingly, in the first operating position, the magazine-housing base is oriented such that the lowermost enclosure of a stack of flexible enclosures can be gripped by the vacuum-sucker arrangement and by way of its front end, as seen in the enclosure-withdrawal direction, can be bent in such a direction, and moved into such a position, that this front end can be gripped directly by the gripper of the supply arrangement, whereas, in the second operating position, with the vacuum-sucker arrangement switched into the inoperative state, the magazine-housing base assumes a position in which the lowermost enclosure of a stack of non-flexible enclosures has its front end, as seen in the enclosure-withdrawal direction, oriented directly in the direction of the awaiting, open gripper of the supply arrangement and can be pushed into the gripper, by the pusher arrangement, in a movement approximately in the plane of the non-flexible enclosure.

Embodiments of a supply station of the type suggested here are described below with references to the following drawings.

DETAILED DESCRIPTION OF THE PRESENT INVENTION

Figure 1:
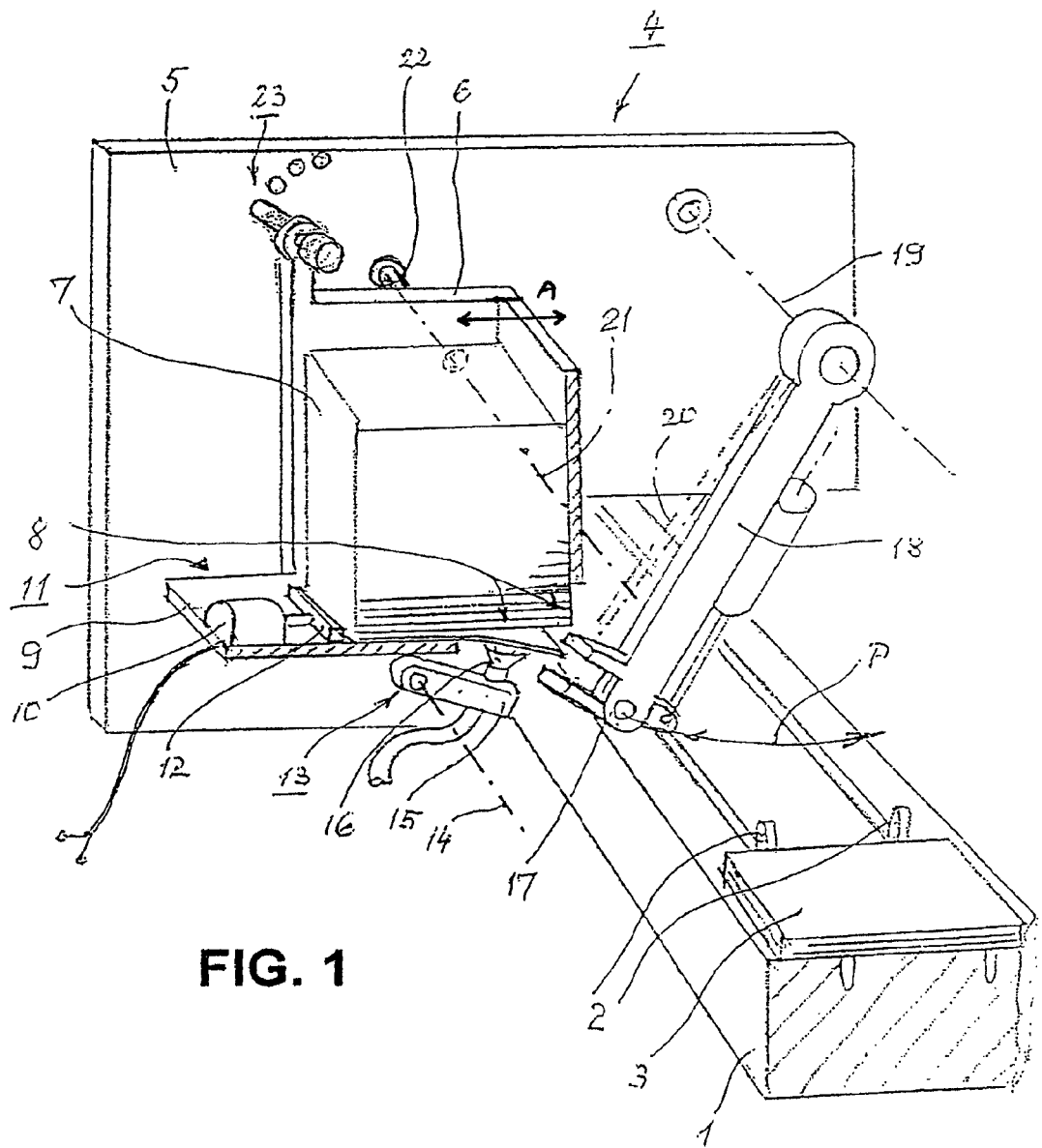
FIG. 1 is a schematic, perspective, partially cutaway illustration of a supply station in a first setting for the processing of flexible enclosures.

FIG. 1 shows an enclosure-collating path 1 on which enclosure compartments are formed, by means of conveying finger pairs 2 mounted on conveyor belts or conveyor chains, for example, in which enclosures are collated for forming stacks of such enclosures 3, each stack differing from the others. For that purpose, enclosure-collating path 1 is directed past individual supply stations, one of which is designated by 4 in FIG. 1.

Supply station 4 comprises a supply station housing or a supply station frame, whereby in FIG. 1 only the supply station housing side wall 5 that is furthest from the observer is shown as part of a supply station housing.

Supported between the side walls 5 of the supply station housing is a magazine housing 6 for the insertion of a stack of enclosures 7, each consisting of same and similar enclosures. The magazine housing is provided in a lower region facing the enclosure-collating path 1 with a cutout 8 that is open in the downward and forward directions. It should be mentioned at this point that the magazine housing 6 and the stack of enclosures 7 inserted therein are shown as a cutaway in a vertical plane parallel to the housing side wall 5 in order to make details of the design more discernible.

The base 9 of the magazine housing 6 is lengthened in the rearward direction opposite the enclosure withdrawal direction, and bears a drive 10 of a pusher arrangement 11, whereby the drive 10 serves to actuate a pusher element 12 with a strip-like form. The function and mode of operation of the pusher arrangement 11 will be explained in detail below.

Figure 2:
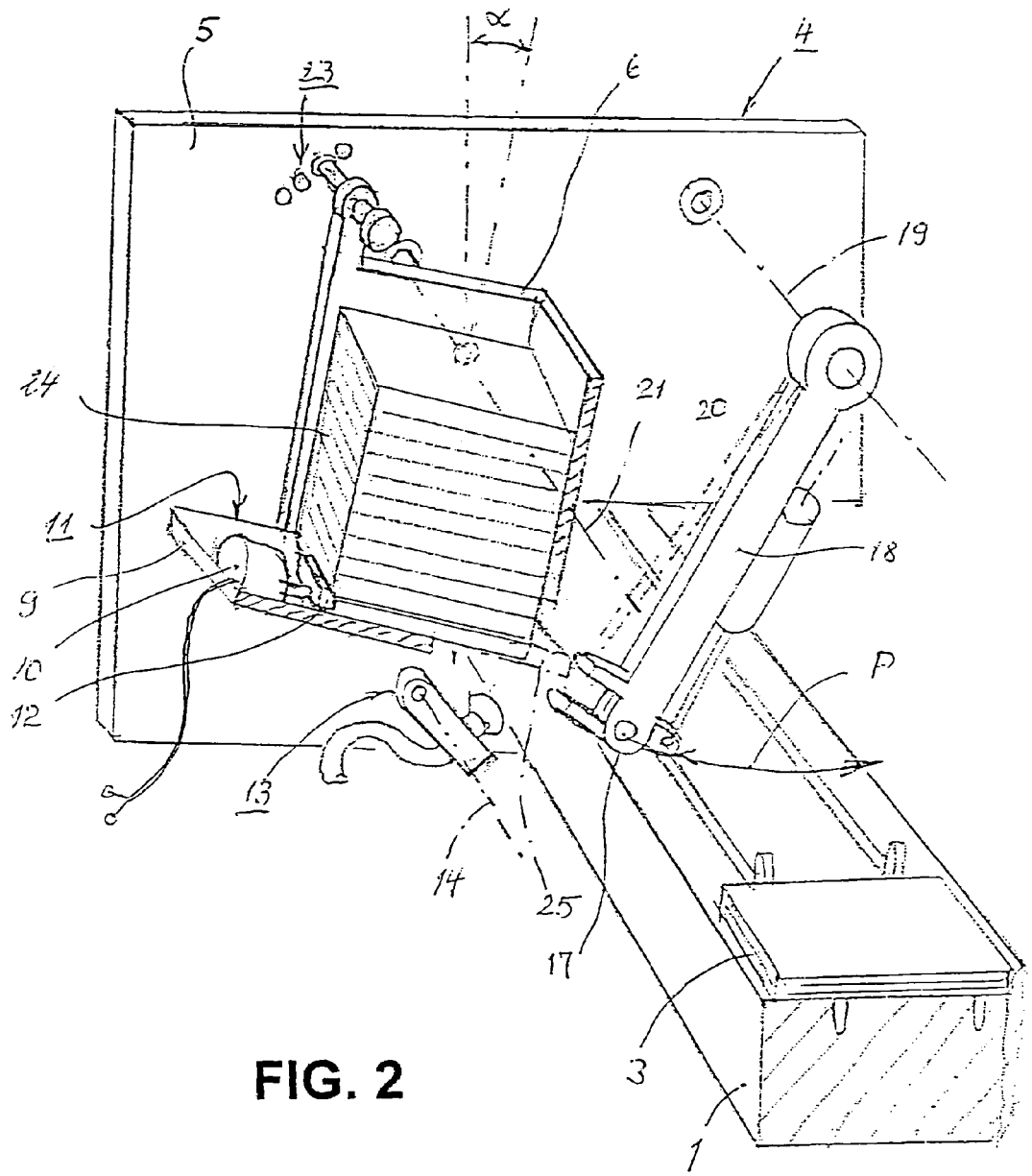
FIG. 2 is a depiction similar to FIG. 1, whereby in FIG. 2 the supply station is shown in a setting for the processing of non-flexible enclosures

Installed underneath the base 9 of the magazine housing 6 is a vacuum sucker arrangement 13 that exhibits a pivot axle or pivot shaft, which is symbolized by a dot-dash line 14 and which is supported or mounted either on the base 9 of the magazine housing 6 or on the side walls 5 of the supply station housing in such a way that by means of a suitable drive, not shown in FIGS. 1 and 2, a link rod 15 that bears vacuum suckers 16 can be pivoted back and forth around the pivot axle or pivot shaft. The vacuum suckers 16 are affixed on a given link rod 15 at a position such that when the vacuum sucker 16 is exposed to a vacuum and the link rod 15 pivots counter-clockwise relative to the position of FIG. 1, the vacuum sucker 16 grips a particular lowermost flexible enclosure of the stack of enclosures 7 near its front region in the enclosure-withdrawal direction and, with the subsequent pivoting of the link rod 15 in the clockwise direction, bends this region of the enclosure downwards into the position shown in FIG. 1.

In this ready-for-withdrawal position of the lowermost flexible enclosure, the gripper 17 at the lower end of a gripping arm 18, which can be pivoted back and forth around an axle 19 in the direction of the arrow P in a plane perpendicular to the transport direction of the enclosure-collating path 1, when at the end of the working stroke in the clockwise direction indicated by the dot-dash line at 20 is able to grip with its gripper claws the front end, in the withdrawal direction, of the lowermost enclosure of a stack of enclosures 7, since the mouth opening of the gripper claws of the gripper 17 is aligned towards the bend created by the vacuum sucker arrangement 13 in the lowermost enclosure, which at the same time is separated from the part of the stack of enclosures 7 lying over it so it can be gripped by the gripper claws of the gripper 17.

According to a very important feature of the supply station suggested here, the magazine housing 6 can be pivoted relative to the receiving station housing around a geometric axis 21, which is oriented parallel to the conveying direction of the enclosure-collating path 1 and the pivot axle 19 of the gripper arm 18. The geometric axis 21 runs at a very specific height above the level of the base 9 of the magazine housing 6, as well as at a specific distance opposite the enclosure withdrawal direction behind the front wall of the magazine housing 6. In the embodiment according to FIG. 1 and FIG. 2, the ability of the magazine housing 6 to pivot relative to the supply station housing is achieved in that axle pieces, which are coaxial to the geometric axis 21 and one of which is indicated by 22, reach from the side walls 5 of the supply station housing to the particular opposite side wall of the magazine housing 6.

In addition, symbolized between the magazine housing 6 and the side wall 5 of the supply station housing of the supply station 4 is a securing arrangement 23, which can be formed by a spring-loaded index pin that is placed on the magazine housing side wall and can be moved perpendicular to same, and index recesses in the side wall 5 of the supply station that interact with it. Of course, many kinds of different designs of securing arrangements can also be used here.

In any case, when a stack 7 of flexible enclosures is inserted into the magazine housing 6, it is locked by the securing arrangement 23 into the position shown in FIG. 1, so that the lowermost enclosure can be gripped by the vacuum sucker arrangement 13 and brought into the bent down position in which the gripper 17 can grip this lowermost enclosure, withdraw it and position it on the enclosure-collating path 1 as was explained in detail above.

However, if, as shown in FIG. 2, a stack of enclosures 24 comprised of comparatively thick, less flexible or even completely inflexible enclosures is inserted into the magazine housing 6, then the magazine housing 6 is fixed by means of the securing arrangement 23 pivoted in the clockwise direction around the geometric axis 21 by an angle α relative to the position shown in FIG. 1. Moreover, in this operating position the vacuum sucker arrangement 13 is pivoted away from the opening 8 of the magazine housing 6 and is switched to the inactive state, since the vacuum sucker arrangement 13 would no longer be able to bend down the less flexible or even completely inflexible enclosures of the stack of enclosures 24, as was explained with regard to the flexible enclosures of the stack of enclosures 7 according to FIG. 1.

Serving now to transport the lowermost enclosure of the stack of enclosures 24 into a ready-for-withdrawal position is the drive 10, which presses the pusher element 12 against the rear edge, relative to the withdrawal direction, of the lowermost enclosure of the stack of enclosures 24, and pushes this enclosure into the position indicated by the dot-dash lines at 25. In this position of the lowermost enclosure, at the end of the operating stroke indicated by dot-dash lines at 20, the gripper 17 can grip with its open gripper claws the front edge, relative to the withdrawal direction, of the lowermost enclosure, whereby because of the oblique position of the magazine housing 6 corresponding to the angle α, this enclosure is aligned toward the opening of the mouth of the gripper claws, and in addition, protrudes sufficiently for gripping by the gripper claws that their upper part does not come into contact against the enclosures of the stack of enclosures 24 that are still in the stack and lying above.

It can be seen that the position of the pivoting axis 21 of the magazine housing 6 is accordingly to be selected in such a way that the base 9 of the magazine housing is placed obliquely enough according to the alignment of the opening of the gripper mouth in order to be able to grip a non-bendable lowermost enclosure, and in addition, in such a way that the bottom region of the stack of enclosures 24 is drawn back to an adequate extent relative to the gripper claws in their maximum position.

From the preceding, it can be seen that the changeover of operation of the supply station suggested here, from the processing of flexible enclosures to a processing of less flexible or non-flexible enclosures can take place in a few manual operations.

According to further developments not shown in FIGS. 1 and 2, the pusher arrangement 11 can be mounted on the base 9 of the magazine housing 6 so it can be moved and fixed in a particular position in order to adjust to different enclosure formats.

In addition, side wall parts of the magazine housing 6 can be designed to be adjustable to different enclosure formats, as indicated by the arrow A in FIG. 1. Designs in this regard are completely familiar to the person skilled in the art, so a detailed description is unnecessary here.

Figure 3:
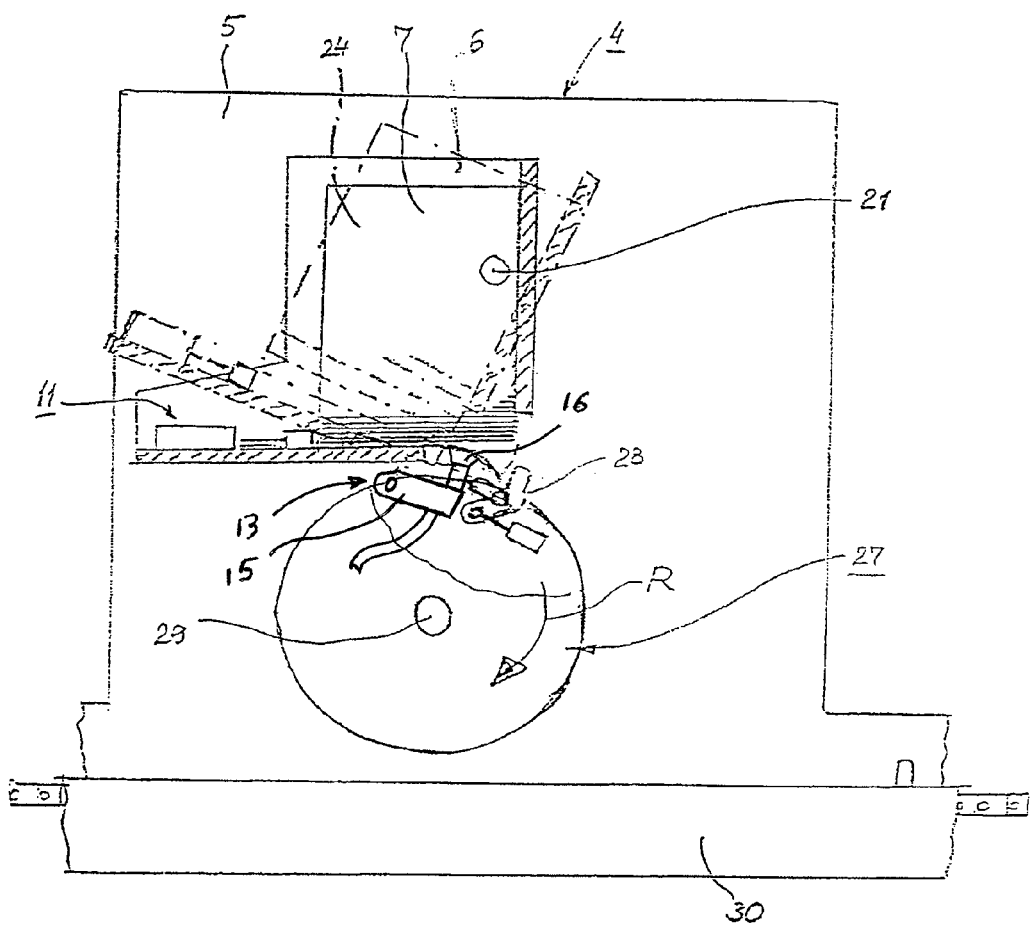
FIG. 3 is a schematic, partially sectional side view of another embodiment of a supply station of the type suggested here, whereby two different operating positions are indicated.

In the representation in FIG. 3, which shows another embodiment of a supply station of the type suggested here, the same reference symbols are used for all parts that correspond to those of the embodiment according to FIGS. 1 and 2. The design and function of such parts correspond to those of the corresponding parts according to FIGS. 1 and 2, whereby a detailed description is to that extent unnecessary. A securing arrangement 23 assigned to the magazine housing 6 has been left out of FIG. 3 for the sake of simplifying the representation, but such a securing arrangement with a function corresponding to a securing arrangement 23 according to FIGS. 1 and 2 is in any event provided for the magazine housing 6 according to FIG. 3.

The position of the magazine housing 6 for the processing of a stack of enclosures 7 comprised of flexible, comparatively thin enclosures is shown in continuous lines, while the position of the magazine housing 6 for the processing of less flexible or completely inflexible, thick enclosures of a stack of enclosures 24 is drawn in dot-dash lines.

In the embodiment according to FIG. 3, a rotary feeder 27 which bears on its circumference a gripper 28 and is of a design that is, for example, known in the art, and which is installed underneath the magazine housing 6 and the rotational axis 29 of which runs parallel to the above-mentioned geometrical axis 21, the track of which is also designated by 21 in FIG. 3 and which is oriented perpendicular to the conveying direction of an enclosure-collating path 30, which here runs perpendicular to the front edge, relative to the enclosure withdrawal direction, of the enclosures. A drive that is not shown in FIG. 3 serves to put the rotary feeder 27, which forms the supply arrangement here, into rotation in the direction of the arrow R.

If a thin, flexible enclosure from the stack of enclosures 7 at its lower end in the position of the magazine holder 6 shown in continuous lines is bent downward by a vacuum sucker arrangement 13, as shown in FIG. 3, then the front edge of the enclosure relative to the withdrawal direction moves into a position approximately in the direction of the mouth opening of the gripper 28 and can be gripped by a suitable drive when the upper claw of the gripper 28 closes, so that when the rotation of the rotary feeder continues in the direction of the arrow R, the enclosure can be withdrawn and inserted into an enclosure compartment of the enclosure-collating path 30.

If the magazine housing 6 is in the position indicated in dot-dash lines, the pusher arrangement 11 then pushes the lowermost, less flexible or completely inflexible enclosure of the stack of enclosures 24 forward in the withdrawal direction directly into the mouth opening of the gripper 28, so that when the movable claw of the gripper 28 closes, it can be gripped, withdrawn and inserted into an enclosure compartment of the enclosure-collating path 30.

Figure 4:
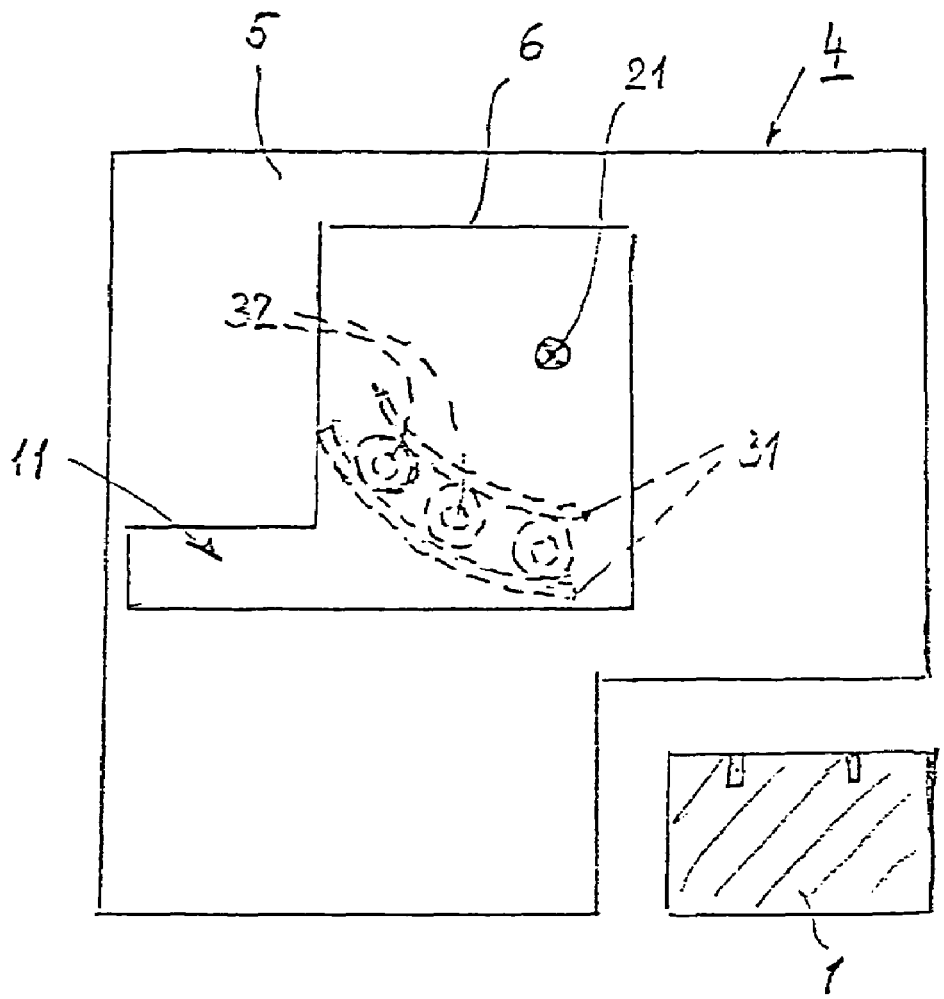
FIG. 4 is a highly schematized and partially sectional side view of an embodiment of a supply station, of the type shown in FIGS. 1 and 2, for example, in order to clarify a useful detail.

In FIG. 4, it can be seen that in the embodiment according to FIGS. 1 and 2 the pivotability of the magazine housing 6 relative to the supply station housing of the supply station 4 does not necessarily have to be brought about by a physical axle arrangement with axle segments 22 that are coaxial to the geometric axis 21 between the side wall 5 of the supply station housing on the one side and the adjacent side wall of the magazine housing 6 on the other. Instead, the geometric axis 21 can be a virtual pivot axis that is realized in such a way that the guiding and mounting arrangement on the inside of the side walls 5 of the supply station housing or on the outside of the side walls of the magazine housing 6 includes arcuate guides 31 and guide rollers 32 which interact with them and which are accordingly provided on the outside of the magazine housing 6 or on the inside of the side walls 5 of the supply station housing respectively, whereby the center points of curvature of the arcuate guides 31 lie on the mentioned geometric axis 21. The track of the geometric axis is again designated by 21 in FIG. 4 and is shown there.

While the enclosure-collating path 1 is shown schematically cut away in FIG. 4, it is understood that the design of the guiding and mounting arrangement for the magazine housing that was just explained above can also be provided for the embodiment according to FIG. 3 with a rotary feeder as the supply arrangement. It should also be noted with regard to the representation of FIG. 4 that a supply arrangement with a gripper provided at the end of a gripper arm of the type shown in the representation of FIGS. 1 and 2 has been left out here for the sake of simplifying the representations.

What is claimed is:

1. A supply station for positioning enclosures on an enclosure-collating path of a mail-processing installation, the supply station comprising:
   a supply station housing;
   a magazine housing configured to support a stack of enclosures, wherein the magazine housing is pivotably disposed on the supply station housing, and wherein the magazine housing comprises:
      a side wall proximate to the supply station housing;
      a base; and
      a front wall substantially perpendicular to the side wall and the base, the front wall defining a cutout allowing removal of enclosures from the magazine housing;
   a pivotable vacuum arrangement selectively actuable for bending a leading edge of a lowermost flexible enclosure into a withdrawal position;
   a pusher arrangement selectively actuable for pushing a trailing edge of a lowermost low flexibility enclosure to move a leading edge of the lowermost low flexibility enclosure into the withdrawal position;
   a gripper arrangement for gripping and withdrawing from the magazine housing respective enclosures in the withdrawal position and for transporting the enclosures onto the enclosure-collating path; and
   a mounting arrangement for securing the magazine housing in a selected operating position,
   wherein the magazine housing is pivotable between a first operating position in which the vacuum arrangement is actuated to bend the leading edge of the lowermost flexible enclosure into the withdrawal position, and a second operating position in which the pusher arrangement is actuated to push the trailing edge of the lowermost low flexibility enclosure to move the leading edge of the lowermost low flexibility enclosure into the withdrawal position.

2. A supply station according to claim 1, wherein the pusher arrangement is disposed on the magazine housing base.

3. A supply station according to claim 1, wherein at least one wall of the magazine housing is adjustable to accommodate different enclosure formats.

4. A supply station according to claim 1, wherein the mounting arrangement comprises components extending from the supply station housing to the side wall of the magazine housing.

5. A supply station according to claim 1, wherein the gripper arrangement comprises:
- a gripper arm pivotable in a plane substantially perpendicular to a conveying direction of the enclosure-collating path; and
- a gripper disposed on an end of the gripper arm.

6. A supply station according to claim 1, wherein the gripper arrangement comprises:
- a rotary feeder having an axis of rotation substantially parallel to a conveying direction of the enclosure-collating path; and
- a gripper disposed on a circumferential surface of the rotary feeder.

7. A supply station according to claim 1, wherein the mounting arrangement comprises:
- arcuate guides disposed on one of the supply station housing and the side wall of the magazine housing; and
- guide rollers disposed on the other of the side wall of the magazine housing and the supply station housing interacting with the arcuate guides for guiding the magazine housing between the first operating position and the second operating position.

* * * * *